(12) United States Patent
Kawabe et al.

(10) Patent No.: US 9,895,867 B2
(45) Date of Patent: Feb. 20, 2018

(54) LAMINATED MOLDED BODY (71) Applicant: FUKUI PREFECTURAL GOVERNMENT, Fukui-shi, Fukui (JP)

(72) Inventors: Kazumasa Kawabe, Fukui (JP); Hideki Sasayama, Fukui (JP); Keiichi Kondo, Fukui (JP)

(73) Assignee: FUKUI PREFECTURAL GOVERNMENT, Fukui-shi (JP)

( * ) Notice: Subject to any disclaimer, the term of this patent is extended or adjusted under 35 U.S.C. 154(b) by 0 days.

(21) Appl. No.: 14/780,357

(22) PCT Filed: Mar. 18, 2014

(86) PCT No.: PCT/JP2014/057338
§ 371 (c)(1),
(2) Date: Sep. 25, 2015

(87) PCT Pub. No.: WO2014/156836
PCT Pub. Date: Oct. 2, 2014

(65) Prior Publication Data
US 2016/0039185 A1    Feb. 11, 2016

(30) Foreign Application Priority Data

Mar. 28, 2013  (JP) ................................ 2013-068574
Mar. 14, 2014  (JP) ................................ 2014-051241

(51) Int. Cl.
B32B 27/08      (2006.01)
B32B 9/04       (2006.01)
(Continued)

(52) U.S. Cl.
CPC ............. *B32B 27/08* (2013.01); *B32B 5/26* (2013.01); *B32B 27/12* (2013.01); *B32B 27/18* (2013.01);
(Continued)

(58) Field of Classification Search
None
See application file for complete search history.

(56) References Cited

U.S. PATENT DOCUMENTS 8,361,265 B2    1/2013  Wadahara et al.
8,906,494 B2    12/2014 Wadahara et al.
(Continued)

FOREIGN PATENT DOCUMENTS

| EP | 2052831 A1 | 4/2009 |
| EP | 2067592 A1 | 6/2009 |
| EP | 2311892 A1 | 4/2011 |
| JP | 2005-105151 A | 4/2005 |
| JP | 2010-525101 A | 7/2010 |

(Continued)

OTHER PUBLICATIONS

Communication dated Aug. 31, 2016 from the European Patent Office in counterpart application No. 14774490.8.
(Continued)

*Primary Examiner* — Bijan Ahvazi
*Assistant Examiner* — Thuy-Ai N Nguyen
(74) *Attorney, Agent, or Firm* — Sughrue Mion, PLLC (57) ABSTRACT

The present invention has an object to provide a laminated molded body in which a thin fiber reinforced layer is laminated and having a favorable strength characteristic. The laminated molded body (1) includes a laminated portion (a laminated portion of $SR_1$ on an upper side and $SR_1$, for example) in which fiber reinforced layers $SR_1$ to $SR_n$, each having a thickness of 20 to 80 μm in which a reinforcing fiber material is dispersed in a thermosetting resin material which serves as a matrix, are laminated, and a laminated portion in which a resin layer is laminated between the fiber reinforced layers (a laminated portion of $SR_2$ on the upper side, $TP_1$, and $SR_3$, for example).

7 Claims, 3 Drawing Sheets

(51) Int. Cl.
*B32B 17/06* (2006.01)
*C08J 5/24* (2006.01)
*B32B 5/26* (2006.01)
*B32B 27/12* (2006.01)
*B32B 27/18* (2006.01)
*B32B 27/38* (2006.01)
*B32B 27/20* (2006.01)

(52) U.S. Cl.
CPC .............. *B32B 27/20* (2013.01); *B32B 27/38* (2013.01); *C08J 5/24* (2013.01); *B32B 2250/05* (2013.01); *B32B 2255/10* (2013.01); *B32B 2255/26* (2013.01); *B32B 2260/046* (2013.01); *B32B 2262/101* (2013.01); *B32B 2262/106* (2013.01); *B32B 2264/0264* (2013.01); *B32B 2305/08* (2013.01); *B32B 2307/514* (2013.01); *B32B 2307/54* (2013.01); *B32B 2307/552* (2013.01); *B32B 2307/558* (2013.01)

(56) References Cited

U.S. PATENT DOCUMENTS

| | | |
|---|---|---|
| 2008/0286578 A1 | 11/2008 | Tilbrook et al. |
| 2009/0291278 A1 | 11/2009 | Kawabe et al. |
| 2010/0092770 A1 | 4/2010 | Wadahara et al. |
| 2011/0111663 A1 | 5/2011 | Kawamoto et al. |
| 2013/0122241 A1 | 5/2013 | Wadahara et al. |

FOREIGN PATENT DOCUMENTS

| | | |
|---|---|---|
| WO | 2008/020628 A1 | 2/2008 |
| WO | 2009/157295 A1 | 12/2009 |

OTHER PUBLICATIONS

"Shin Sedai Sentan Fukugo Zairyo Seikeihin no Tameno Hakuso Tajiku Prepreg Sheet to sono Seikeiho no Kaihatsu", 29 pages total, Fukui Industrial Support Center, 2009. 11.

International Search Report for PCT/JP2014/057338 dated Jun. 10, 2014.

LAMINATED MOLDED BODY

CROSS REFERENCE TO RELATED APPLICATIONS

This application is a National Stage of International Application No. PCT/JP2014/057338 filed Mar. 18, 2004, claiming priority based on Japanese Patent Application Nos. 2013-068574, filed Mar. 28, 2013 and 2014-051241, filed Mar. 14, 2014, the contents of all of which are incorporated herein by reference in their entirety.

TECHNICAL FIELD

The present invention relates to a laminated molded body including a fiber-reinforced composite material using a reinforcing fiber material such as a carbon fiber, a glass fiber and the like and, as a matrix (base material), a thermosetting resin material such as an epoxy resin, an unsaturated polyester resin and the like or a thermoplastic resin material such as a polypropylene resin, a polyamide resin, a polyether imide resin and the like.

BACKGROUND ART

The fiber-reinforced composite material is made by combining the reinforcing fiber material and a material which serves as a matrix and is a material which is light-weighted, highly rigid and capable of diversified functional designs. Thus, it is used in a wide variety of fields such as the aerospace field, the transport field, the civil engineering and construction field, the exercise apparatus field and the like. Particularly, fiber reinforced plastics (FRP) made by combining a reinforcing fiber material such as carbon fiber and a glass fiber with a thermosetting resin material constitutes a mainstream. In the fiber-reinforced composite material, a laminated molded body with strength in multiple directions reinforced is used in many cases by laminating prepreg sheets which are reinforced in one direction and setting an aligned direction of each layer in multiple directions.

Since the laminated molded body has a reinforced direction of each layer different from each other, it has a problem that delamination can easily occur. Particularly if the thermosetting resin material such as an epoxy resin is used as a matrix, the thermosetting resin material has a problem that its toughness is low in general and delamination can easily occur. For example, if an impact load or the like is applied to the laminated molded body, even though it appears to have no problem, the delamination occurs inside the molded body, dynamic characteristics as the laminated molded body lower, and the laminated molded body is in a state easy to be broken in many cases.

As a measure against such delamination of the laminated molded body, Patent Literature 1, for example, describes a fiber-reinforced composite material formed of a reinforced fiber formed of a long fiber, a thermosetting resin composition, a particle not soluble in the thermosetting resin composition, and a particle having a resin soluble in the thermosetting resin composition as a material and both particles are localized on a surface, and describes a point that a handling performance of prepreg is maintained by the both particles localized on the surface while an anti-impact characteristic and an inter-layer toughness are improved. Moreover, the prepreg having a reinforced fiber, a matrix resin, and a resin particle as constituent elements is described also in Patent Literature 2.

On the other hand, it has been made clear that a molded body in which thin prepreg sheets in which a thermosetting resin material is impregnated into a reinforced fiber bundle are laminated has dynamic characteristics different from those of the molded body made by laminating prepreg sheets each having a prior-art thickness.

For example, in a molded body in which thin prepreg sheets are laminated, occurrence of delamination is suppressed in tension characteristics as compared with a molded body in which thick prepreg sheets are laminated (Non Patent Literature 1). Moreover, regarding bending characteristics and compression characteristics of the molded body in which thin prepreg sheets are laminated, differences in maximum strength and initial modulus of elasticity of a specimen cut out in various directions are reduced, and it is shown that quasi-isotropic properties are improved as compared with use of thick prepreg sheets (Non Patent Literatures 2 and 3). Moreover, it has become known that the molded body in which thin prepreg sheets are laminated have improved fatigue life as compared with the use of thick prepreg sheets (Non Patent Literature 4).

Regarding impact characteristics, as the result of internal observation after a falling-weight impact load from an off-plate direction to a molded body in which thick prepreg sheets are laminated and a molded body in which thin prepreg sheets are laminated, it was observed that large delamination occurs in an internal layer even in the molded body in which thin prepreg sheets are laminated (Non Patent Literature 5). Regarding compression strength after the impact, slight improvement in strength is found in the molded body in which thin prepreg sheets are laminated as compared with the use of thick prepreg sheets (Non Patent Literature 5), however, as described in Patent Literature 1 and the like, it falls short of improvement of the impact characteristics of the molded body including a layer in which particles are present between layers.

CITATION LIST

Patent Literature

PTL 1: Japanese Patent Laid-Open No. 07-41575
PTL 2: U.S. Pat. No. 5,028,478

Non Patent Literature

NPL 1: "Influence of Layer Thickness relating to Initial Breakage of Multi-directional Reinforced Composite Material Laminated Plate" by Hideki Sasayama and five others, Journal of the Japan Society for Composite Materials, 30, 4 (2004), pp. 142 to 148
NPL 2: "Influence on Bending Characteristics of Layer Thickness and Lamination Constitution of CFRP Laminated Plate Using Super-thin Layer Prepreg Sheet" by Naoaki Iida and 6 others, Abstracts of $61^{st}$ Meeting for Research Papers, Hokuriku Branch, The Society of Polymer Science, Japan, November, 2012, p. 188
NPL 3: "Influence of Layer Thickness relating to Compression Characteristics of Multi-directional Reinforced Composite Material Laminated Plate" by Kazumasa Kawabe and three others, Journal of the Japan Society for Composite Materials, 34, 5 (2008), pp. 173 to 181
NPL 4: "Spreading Technique and New Composite" by Kazumasa Kawabe, Journal of the Society of Fiber Science and Technology, Japan, 64, 8 (2008), pp. 262 to 267

NPL 5: H. Saito et al., "Effect of ply-thickness on impact damage morphology in CFRP laminates" Journal of Reinforced Plastic and Composites, 30(13), 1097 to 1106 (2011)

SUMMARY OF INVENTION

Technical Problem

If a molded body in which particles are localized on surfaces of a thin prepreg sheet are laminated is manufactured by using the methods described in the aforementioned Patent Literature 1 and 2, it is considered that various characteristics such as tension characteristics, fatigue characteristics, impact characteristics and the like of the molded body are improved by an effect of thinning the prepreg sheet to be laminated and an effect of an inter-layer resin layer considered to absorb an impact.

However, when a molded body in which a thin prepreg sheet in which the particles are localized on the surface is laminated is to be designed, the smaller the thickness of the prepreg sheet becomes, the thinner the resin layer should be made. Further, a grain size of a particle should be reduced and localized in a slight amount. That is because, by thinning the prepreg sheet, a fiber amount also becomes small, and unless the thickness of the resin layer is reduced with the decrease of the fiber amount, characteristics such as high strength and high elasticity realized by use of a reinforced fiber cannot be sufficiently exerted.

For example, when the prepreg sheet is to be designed, by setting a fiber reinforced layer in which fibers are present to a fiber volume content (Vf) at approximately 72% and a thickness of approximately 40 µm, and by making setting such that a resin layer with a thickness of approximately 20 µm is formed on one surface thereof, an obtained prepreg sheet has a thickness of approximately 60 µm and Vf at approximately 48%. In order to sufficiently exert the effect of the reinforced fiber, if Vf is set to 50% or more, the resin layer needs to be set to approximately 17 µm or less, and if Vf is further set to 60% or more, the resin layer needs to be approximately 8 µm or less. If the resin layer is set to 20 µm or less, a sufficient effect of the impact resistance cannot be obtained easily.

It is difficult to stably and continuously fabricate a resin layer including thermoplastic resin particles of 20 µm or less or particularly of 10 µm or less and the like. In order to have the resin layer including the thermoplastic resin particles and the like with 20 µm or less, the grain size of the particle needs to be made small, but mass production of the particle of 10 µm or less is difficult, and it is also technically difficult to uniformly distribute the particles in a slight amount and to form a layer. Thus, with a prior-art laminated molded body, it is difficult to fabricate a prepreg sheet having a resin layer in which the thermoplastic resin particles are localized on one surface of a thin fiber reinforced layer with a thickness of 40 µm or less or particularly a prepreg with Vf at 50% or more, and it has been difficult to mold a laminated molded body with a high quality having a thin resin layer between thin fiber reinforced layers.

Thus, the present invention has an object to provide a laminated molded body with thin fiber reinforced layers laminated and having favorable strength characteristics.

Solution to Problem

A laminated molded body according to the present invention is a laminated molded body in which a fiber reinforced layer with a reinforcing fiber material dispersed in a resin material which serves as a matrix is laminated, and the fiber reinforced layer is set to a thickness of 20 to 80 µm and includes a laminated portion in which the fiber reinforced layer is laminated and a laminated portion in which a resin layer is laminated between the fiber reinforced layers. Moreover, the fiber reinforced layers are laminated so that axial directions thereof are set to different directions, and the resin layer is disposed adjacent to the fiber reinforced layers in all the set directions. Moreover, an axial direction of the reinforcing fiber material of the fiber reinforced layer is one direction. Moreover, the laminated portion is constituted by using a multi-axis reinforced sheet material. Moreover, at least one of powder, fiber, and film is dispersed in the resin layer. Moreover, the resin material and the resin layer are thermosetting resin materials, and the thermoplastic resin material is dispersed in the resin layer.

Advantageous Effects of Invention

The laminated molded body according to the present invention can have occurrence of delamination suppressed and have favorable strength characteristics with improved impact resistance characteristics and fatigue life by providing the aforementioned constitution.

DESCRIPTION OF EMBODIMENTS

An embodiment according to the present invention will be described below in detail. The embodiment described below is a preferred embodiment in putting the present invention into practice, and various technical limitations are made, but the present invention is not limited to these forms unless it is explicitly specified the present invention is particularly thus limited in the description below.

Figure 1:
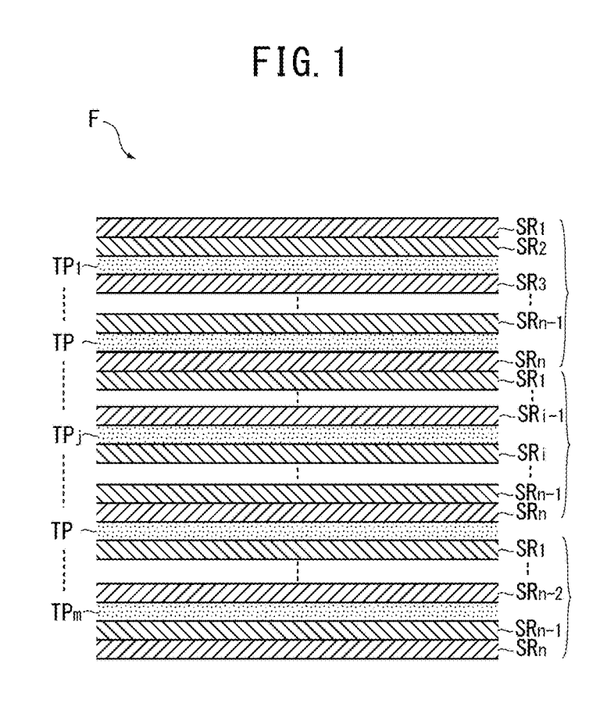
FIG. 1 is a schematic view relating to a section of a laminated molded body which is an embodiment according to the present invention.

FIG. 1 is a schematic view illustrating apart of a section of a laminated molded body F which is an embodiment according to the present invention in an enlarged manner. The laminated molded body F has a plurality of sheet-shaped fiber reinforced layers in which a reinforcing fiber material is dispersed in a resin material which serves as a matrix being laminated and includes a laminated portion in which the fiber reinforced layers are laminated and a laminated portion in which a resin layer is laminated between the fiber reinforced layers. A fiber volume content (Vf) of the entire laminated molded body F is set to 30% to 80%, preferably to 50% to 70% or more preferably 55% to 65%.

If Vf becomes smaller than 30%, a fiber reinforcement effect of the laminated molded body F cannot be sufficiently obtained, while if 80% is exceeded, a resin amount decreases, a void can be easily generated in the fiber reinforced layer, and dynamic characteristics of the laminated molded body F deteriorates. Moreover, by disposing the resin layer between the fiber reinforced layers, impact resistance characteristics and the like can be improved.

Each of the fiber reinforced layer has a thickness of 20 μm to 80 μm and is arrayed in multiple directions and laminated so that reinforcing fiber materials of each layer are aligned in n (n is 2 or more) axis directions. In FIG. 1, a laminated body in which the fiber reinforced layers $SR_1$ to $SR_n$, are laminated is repeatedly laminated. The axial direction of each fiber reinforced layer is set so as to be shifted by different angles, respectively, with respect to a reference direction and laminated so as to have different axial directions. A portion in which the fiber reinforced layer is directly laminated (laminated portions $SR_1$ and $SR_2$ on an upper side, for example) is formed as a laminated portion in which the fiber reinforced layers are laminated, and a portion in which the fiber reinforced layer, a resin layer, and the fiber reinforced layer are laminated (laminated portion $SR_2$, $TP_1$, and $SR_3$ on the upper side, for example) is formed as a laminated portion in which the resin layer is laminated between the fiber reinforced layers.

The laminated molded body obtained by setting the thickness of the fiber reinforced layer to 80 μm or less gains an effect that occurrence of delamination is suppressed in the tension characteristics as compared with a molded body in which a fiber reinforced layer with the thickness of 120 μm or more is laminated. Moreover, regarding to the bending characteristics and compression characteristics, differences in maximum strength and initial modulus of elasticity of a specimen cut out in various directions are reduced, and an effect of improvement of quasi-isotropic properties is obtained. Moreover, an effect of improvement of a fatigue life can be also obtained.

The thickness of the fiber reinforced layer is smaller the more favorable, and 40 μm or less is more preferable. However, it is difficult to have the thickness of 20 μm or less. For example, a diameter of a general-purpose carbon fiber is approximately 7 μm, and if a fiber reinforced layer having the thickness of 20 μm or less using the carbon fiber for the reinforcing fiber material is to be fabricated, three carbon fibers or less should be dispersed in the thickness direction, and manufacture is difficult. Moreover, the resin material which serves as a matrix should be also made a sheet shape of 10 μm or less, and manufacture of this sheet is also difficult and continuous and stable obtainment of fiber reinforced layers is difficult. Thus, it is preferable to fabricate the fiber reinforced layer at 20 μm or more also from a view of keeping of a constant quality.

The fiber reinforced material of the fiber reinforced layer is constituted by a plurality of reinforced fibers. The reinforced fibers include inorganic fibers or organic fibers with high strength/high modulus of elasticity used for a fiber reinforced composite material such as a carbon fiber, a glass fiber, a ceramic fiber, a polyoxymethylene fiber, an aromatic polyamide fiber and the like, a plurality of these fibers may be combined, and fineness is not particularly limited. Moreover, it may be made of those molded into a wide and thin reinforced fiber sheet by a known pneumatic spreading method (see Japanese Patent No. 4740131, for example). As the reinforcing fiber material, a woven cloth woven with the reinforcing fibers as warp and weft may be also used. In this case, the axial directions of the reinforcing fiber material are two directions, that is, a warp direction and a weft direction.

As the resin material which serves as a matrix of the fiber reinforced layer, a thermosetting resin material such as an epoxy resin, an unsaturated polyester resin, a vinyl-ester resin, a phenol resin and the like or a polypropylene resin, a polyamide resin, a polyphenylenesulfide resin, a polyetherimide resin, a polyetheretherketone resin, and moreover, a thermoplastic resin material such as a polymer alloy resin and the like obtained by mixing two types or more of these thermoplastic resins can be cited. Particularly, the epoxy resin of the thermosetting resin is favorably used and is used in combination with a hardening agent or hardening catalyst in general.

The fiber reinforced layer is manufactured by using a prepreg sheet material or the like manufactured by a known prepreg manufacturing device for impregnating the reinforcing fiber material with the thermosetting resin material or the thermoplastic resin material. Moreover, if the thermoplastic resin material is used, a fiber reinforced layer can be manufactured by using a sheet material as a prepreg sheet material obtained by bonding the reinforcing fiber material to the thermoplastic resin material which was made a sheet shape by heat seal or the like. It is only necessary that the prepreg sheet material is cut into an appropriate length, and the cut sheet material is laminated so that the axial directions of the reinforcing fiber materials are set to become different directions from each other. Then, as will be described later, the resin layer is inserted every plural layers and laminated, and the laminated object is subjected to heating or hot press-molding so as to manufacture the laminated molded body.

If the prepreg sheet material in which the reinforcing fiber material is impregnated with a matrix resin is to be used, a thickness approximating the thickness of the prepreg sheet material becomes the thickness of the fiber reinforced layer. Moreover, if the prepreg sheet material in a state in which the matrix resin is semi-impregnated into or heat sealed to the reinforcing fiber material is to be used, a thickness approximating the thickness when the reinforcing fiber material is impregnated with the matrix resin becomes the thickness of the fiber reinforced layer.

As manufacture of the prepreg sheet material which becomes the fiber reinforced layer, the prepreg sheet material is manufactured as follows, for example. When the thickness of the prepreg sheet material is set to t μm, a weight of the reinforcing fiber material Wf g/m² is acquired by the thickness t μm×(set fiber volume content Vf %/100)× (reinforcing fiber material specific weight $\rho_f$. For example, if the prepreg sheet material with the thickness at 40 μm by the carbon fiber (specific weight: 1.8) and the set fiber volume content at 60% is to be fabricated, 40×(60/100)× 1.8=43.2 and thus, a carbon fiber sheet material with the weight at 43.2 g/m² is fabricated, the resin material which becomes the matrix is impregnated, semi-impregnated or bonded. The weight Wm g/m² of the resin material is acquired by the thickness of the prepreg sheet material t μm×(1−(set fiber volume content Vf %/100))×the resin material specific weight $\rho_m$.

The resin layer is disposed between the fiber reinforced layers by every plural layers. The resin layer is constituted by using a single or a plural types of the resin material such as a thermosetting resin material, the thermoplastic resin material and the like. The resin layer is formed by using the same resin as the resin material used for the matrix of the fiber reinforced layer in many cases, but a resin with viscosity different from that of the resin material used for the matrix may be also used. Use of the resin with the different viscosity means formation of the resin layer by using a resin with a viscosity higher than that of the resin which serves as a matrix in order to form the resin layer when the laminated molded body is to be manufactured.

The thickness of the resin layer is preferably 20 μm to 80 μm. If the thickness is 20 μm or less, it is difficult to manufacture the resin layer and a stable resin layer cannot be obtained. Moreover, if the resin layer becomes too thin, the effect of impact resistance cannot be obtained easily. If the thickness becomes 80 μm or more, it becomes difficult to raise the fiber volume content of the laminated molded body. For example, the entire fiber volume content (Vf) in the laminated molded body if the fiber reinforced layer with the thickness at 40 μm and the fiber volume content Vf at 70% is laminated and the resin layer with the thickness at 80 μm is to be inserted every five layers is approximately 50%, which is a preferable value as the fiber volume content of the laminated molded body.

In the resin material constituting the resin layer, the one in which at least one of powder, fiber, fabric, film, perforated film and the like made of a thermoplastic resin material is dispersed can be also used. By using these powder, fiber, fabric, film and the like, the resin layer becomes easy to be formed. Moreover, the effect of improvement of impact resistance can be expected by the thermoplastic resin material. Here, the fact that the resin layer becomes easy to be formed means that excessive outflow and the like of the resin in the resin layer in hot press-molding can be prevented due to presence of these powder, fiber, fabric, film and the like when the laminated molded body is to be manufactured, and the designed thickness of the resin layer can be obtained easily.

A size of the dispersed thermoplastic resin material is preferably a size capable of uniform distribution, and in the case of powder, an average grain size is preferably set to 80 μm or less or preferably to approximately 5 to 40 μm. If a fiber-state thermoplastic resin material is used instead of the powder-state thermoplastic resin material, a short fiber or a long fiber with an average sectional diameter at 40 μm or less is preferably used. In the case of the film-state thermoplastic resin material, the thickness is preferably set to approximately 20 μm to 80 μm.

In the resin material constituting the resin layer, at least one of the powder, fiber, film and the like made of a metal material can be dispersed. Moreover, powder made of a ceramic material can be also dispersed. In this case, improvement of heat resistance of the resin layer can be expected.

Amounts of powder, fiber and the like dispersed in the resin layer are preferably contained at 30% to 70% in a volume ratio of the designed resin layer. If the volume ratio is less than 30%, it is difficult to be dispersed in the entire fiber reinforced layer. If the volume ratio exceeds 70%, the amount of the matrix resin in the resin layer decreases, and when the laminated molded body F is solidified, it is likely that mechanical strength can easily drop due to stress concentration between the layers.

If the resin layer is disposed between the thin fiber reinforced layers each having the thickness of 20 μm to 80 μm, in order to set the Vf value of the entire laminated molded body F to 30% or more, the thickness of the resin layer disposed between the layers needs to be small, but stable mass production of the thin resin layer having the thickness of the fiber reinforced layer or less is technically difficult while the characteristics of the entire resin layer (the amount of thermoplastic resin material per unit area, for example) is kept uniform.

In the present invention, since the resin layer is disposed between the layers not by every other layers but by every plural layers of the fiber reinforced layers, even if the number of resin layers to be disposed is decreased and the resin layer is thicker for that portion, the Vf value of the entire laminated molded body F can be set to 30% or more. In the laminated molded body molded by laminating the thin fiber reinforced layer with the thickness of 20 μm to 80 μm, the characteristics that delamination hardly occurs can be obtained as described above, but in the present invention, in order to improve impact resistance, the thin fiber reinforced layer is used and the resin layer is disposed between the layers by every plural layers, whereby the effect by lamination of the thin layers and the effect of impact resistance can be obtained.

In FIG. 1, in the laminated molded body F, the laminated portion in which the fiber reinforced layers $SR_1$ to $SR_n$ are sequentially laminated is repeatedly laminated, the resin layers $TP_1$ to $TP_m$ are disposed one by one between the fiber reinforced layers by every plural layers, and the laminated portion in which the fiber reinforced layers are laminated and the laminated portion in which the resin layer is laminated between the fiber reinforced layers are constituted. Each of the resin layers is preferably disposed so as to be adjacent to the fiber reinforced layers set in different directions. In the example illustrated in FIG. 1, since the fiber reinforced layers $SR_1$ to $SR_n$ are repeatedly laminated in the same order, the resin layer is disposed one by one between the layers by every (n−1) layers so that the resin layer is disposed at positions shifted one by one in the repetition order of the fiber reinforced layers. Thus, each of the resin layers is disposed adjacent to the fiber reinforced layers with the respective axial directions set to different directions. It may be so configured that the resin layer is disposed one by one between every (n+1) layers and each of the resin layers is disposed adjacent to the fiber reinforced layers with the respective axial directions set to different directions.

As described above, by disposing the resin layer adjacent to the fiber reinforced layers with the respective axial directions set to different directions, if an impact is applied to multi-directional fiber reinforced layers, the resin layers exert a relaxation action in the respective directions, and it is considered that impact resistance can be further improved.

It is only necessary that the resin layer is disposed so as to be adjacent to the fiber reinforced layers whose axial directions are set in different directions and can be disposed at random by every plural fiber reinforced layers. Moreover, if the resin layer is disposed adjacent to the fiber reinforced layers in all the directions, the resin layer can be further added and disposed adjacent to the fiber reinforced layers in the same direction. If the number of the fiber reinforced layers to be laminated is small, it can be disposed adjacent to the fiber reinforced layers only in a part of the directions so as to improve impact resistance, or it may be disposed adjacent to the fiber reinforced layers in the same direction. Moreover, the laminated molded body can have symmetry in the thickness direction by setting such that the laminating orders of the fiber reinforced layer and the resin layer become symmetric from the center of the laminating direction.

Regarding the laminated molded body, if the lamination constitution is set to $[45/0/-45/90]_{6S}$ so as to have a laminated molded body in which the resin layer is disposed every two fiber reinforced layers or three fiber reinforced layers, for example, the lamination constitution is 45/0/resin layer/−45/90/45/resin layer/0/−45/90/resin layer/45/0/−45/resin layer/90/45/0/resin layer/−45/90/45/resin layer/0/−45/90/resin layer/45/0/−45/resin layer/90/90/resin layer/−45/0/45/resin layer/90/−45/0/resin layer/45/90/−45 resin layer/0/45/90/resin layer/−45/0/45/resin layer/90/−45/0/resin layer/45/90/−45/resin layer/0/45. In this lamination, the fiber reinforced layers are constituted by 48 layers, and the resin layers by 16 layers, and the resin layer is disposed at four spots each between fiber reinforced layers of 45° and 0°, 0° and −45°, −45° and 90°, and 90° and 45°, respectively.

Moreover, in another lamination constitution, when the lamination constitution is set to [45/0/−45/90]$_{6S}$ so as to have a laminated molded body in which the resin layer is disposed every four fiber reinforced layers and the resin layer is not disposed in the laminated portion of the 90° layers at center layers, for example, the lamination constitution is 45/0/−45/90/resin layer/45/0/−45/90/resin layer/ . . . /45/0/−45/90/resin layer/45/0/−45/90/90/−45/0/45/resin layer/90/−45/0/45/ . . . /resin layer/90/−45/0/45/ resin layer/90/−45/0/45. In this lamination, the fiber reinforced layers are constituted by 48 layers, and the resin layer is disposed between layers of 90° and 45°, and it is constituted by ten layers in total.

Furthermore, in still another lamination constitution, when the lamination constitution is set to [(45/0/−45/90)$_s$]$_6$ so as to have a laminated molded body in which the resin layer is disposed every eight fiber reinforced layers, the lamination constitution becomes 45/0/−45/90/90/−45/0/45/resin layer/45/0/−45/90/90/−45/0/45/resin layer/ . . . /resin layer/45/0/−45/90/90/−45/0/45/resin layer/45/0/−45/90/90/−45/0/45. In this lamination, the fiber reinforced layers are constituted by 48 layers, and the resin layer is disposed only between layers of 45° and 45°, and it is constituted by five layers in total. In this case, when the laminated objects of symmetric lamination in the thickness direction are laminated in plural, the resin layer is formed between those layers.

As the manufacturing method of the resin layer, if the matrix resin is the thermosetting resin material, the same thermosetting resin material is used, and when the thermosetting resin material is in a liquid state, a fibrous state or grain state thermoplastic resin material, metal material, ceramic material or the like is mixed so as to be uniformly dispersed, and the resin layer can be formed by uniformly spreading a mixture on the prepreg sheet material which becomes the fiber reinforced layer in a sheet state. Then, by laminating the prepreg sheet materials in which the resin layer is formed by every plural layers, the laminated molded body in which the resin layer is disposed between the laminated fiber reinforced layers by every plural layers can be obtained.

Moreover, as another manufacturing method of a resin layer if the matrix resin is the thermosetting resin material, the same thermosetting material as the matrix resin is used, the resin layer can be manufactured by using the resin sheet material formed by uniformly spreading a mixture in a sheet state on mold releasing paper, in which the thermoplastic resin material, a metal material, a ceramic material or the like is mixed when the thermosetting resin material is in a liquid state. It is only necessary that the resin sheet material is disposed between the fiber reinforced layers by removing the mold releasing paper. In this case, a predetermined number of the prepreg sheet materials which become the fiber reinforced layers are laminated, and by inserting the resin sheet material by every plural layers, the laminated molded body can be obtained.

Moreover, the resin sheet material in which particles of the thermoplastic resin material, the metal material, the ceramic material or the like are mixed is continuously bonded to the prepreg sheet material which becomes the fiber reinforced layer by heating or by heated pressurization so as to fabricate a prepreg sheet material in which the resin layer is made to adhere to one surface or both surfaces. There is also a method of obtaining the laminated molded body in which the resin layer is formed by every plural layers by using the prepreg sheet material and the prepreg sheet material to which the resin layer adheres.

As a manufacturing method of the resin layer when the matrix resin is the thermoplastic resin material, the resin layer can be formed by using a film of the thermoplastic resin material with viscosity at a temperature higher than that of the matrix resin and by laminating the film after the prepreg sheet material which becomes the fiber reinforced layer is laminated in plural.

Moreover, as another manufacturing method of the resin layer when the matrix resin is the thermoplastic resin material, the resin layer can be formed by fabricating a film in which particles made of a metal material, a ceramic material or the like are mixed in the same thermoplastic resin as the matrix resin and by laminating the prepreg sheet material which becomes the fiber reinforced layer in plural and then, by laminating the film.

Furthermore, after a reinforced fiber sheet material in which reinforced fiber bundles are juxtaposed in a sheet state and a perforated resin sheet material are laminated as appropriate, a liquid state thermosetting resin material is made to flow in entirely and to uniformly impregnate into it so that the laminated molded body with a portion in which thin fiber reinforced layers are laminated and the resin layer laminated by every plural layers can be obtained. In this case, in order to efficiently impregnate the thermosetting resin material, the laminated product may be accommodated in a sealed container so that the thermosetting resin material is impregnated while air in the container is discharged.

For the laminated plural fiber reinforced layers, a sheet material in which the reinforced fiber sheet material with the reinforced fiber bundles juxtaposed in a sheet state is laminated as appropriate, for example, a multi-axis reinforced sheet material in which reinforced fiber sheet materials are laminated in a multi-axis manner and then, integrated by using a stitch yarn can be used in constitution. As the multi-axis reinforced sheet material, a dual-axis reinforced sheet material in which the reinforced fiber sheet materials are laminated in directions of 0 degrees and 90 degrees or in directions of +45 degrees and −45 degrees and integrated by using a stitch yarn or a quadruple-axis reinforced sheet material in which the reinforced fiber sheet materials are laminated in directions of +45 degrees, 0 degrees, −45 degrees, and 90 degrees and integrated by using a stitch yarn can be cited, for example.

Moreover, as the multi-axis reinforced sheet material, a triple-axis reinforced sheet material in which they are laminated in directions of 0 degrees, 90 degrees, and +45 degrees, in directions of 90 degrees, +45 degrees, and −45 degrees, in directions of +45 degrees, −45 degrees, and 0 degrees or in directions of −45 degrees, 0 degrees, and 90 degrees and integrated by using a stitch yarn can be cited. If four types of the triple-axis reinforced sheet materials with different axial directions are used for lamination, in a state in which all the types of the triple-axis reinforced sheet materials are laminated and a perforated thermoplastic resin film which becomes a resin layer is disposed between the layers, a laminated molded body in which a liquid-state thermosetting resin is made to flow entirely and impregnated and hardened is obtained. The obtained laminated molded body has the axial direction of the reinforced fiber sheet material set in all the directions and disposed adjacent to the thermoplastic resin film and thus, the laminated molded body in which the resin layer is disposed adjacent to the fiber reinforced layers in all the set directions can be easily obtained.

Therefore, by using the multi-axis reinforced sheet material for the laminated plural fiber reinforced layers, the laminated molded body can be efficiently manufactured.

The thin laminated molded body provided with the aforementioned constitution can be a composite molded body combined with another molded body. For example, by using the laminated molded body in which the fibers are oriented in a pair of various directions and by sandwiching a thick laminated molded body in which the fiber reinforced layer with a prior-art thickness is laminated, a composite molded body can be also manufactured. In this case, by disposing the thin laminated molded body on both sides so as to be symmetrical in the thickness direction, the thin fiber reinforced layers on surface layers on the both sides are laminated pseudo-isotropically, and thus, strength characteristics such as bending characteristics and compression characteristics can be improved as compared with the thick fiber reinforced layer. Moreover, by using a thick fiber reinforced layer inside, the number of laminated layers in the entire laminated molded body can be reduced as compared with the use of only the thin fiber reinforced layer. A resin sheet material or a honeycomb structural material can be also used instead of the thick laminated molded body, and various molded bodies can be constituted in accordance with applications. As described above, by using the laminated molded body according to the present invention for a part of a molded body, suppression of delamination and improvement of strength characteristics such as impact resistance are made possible.

EXAMPLE

Example 1

A thin laminated molded body was fabricated by using the following materials and a tension test and a fatigue test were conducted.
<Used Materials>
(Fiber Used for the Reinforcing Fiber Material)
Made by Toray Industries, Inc.; T800SC-24K, number of fibers: 24,000, fiber weight: 1.03 g/m
(Thermosetting Resin Material which Becomes Matrix)
Epoxy resin main agent: jER828:jER1001=4:6 (weight ratio) (both main agents are made by Mitsubishi Plastics, Inc.)
Hardener: dicyandiamide (DICY-15, made by Mitsubishi Plastics, Inc.)
Hardening accelerator: DCMU (DCMU-99, made by Hodogaya Chemical Co., Ltd.)
(Resin Powder Made of Thermoplastic Resin Material)
Made by Toray Industries, Inc.; SP-500, nylon 12 powder, average grain size at 5 μm
    <Lamination of Laminated Molded Body>
    (1) As an epoxy resin main agent, jER828 and jER1001 were kneaded in a weight ratio of 4:6 and then, 8 parts and 3 parts of the hardener and the hardening accelerator to 100 parts of the main agent in a weight ratio, respectively, were added and kneaded so as to obtain an epoxy resin.

(2) In a resin coating device (made by HIRANO TECSEED Co., Ltd.), the epoxy resin fabricated in the process (1) was continuously applied with a width of 340 mm and an application amount of 13 g/m² onto mold release paper so as to fabricate an epoxy resin sheet.

(3) The 16 reinforced fiber bundles were juxtaposed at an interval of 20 mm in a width direction, and each fiber bundle was spread to a width of 20 mm by a spreading device (made by Hokushin Co., Ltd.) for spreading by a pneumatic spreading method (see Japanese Patent No. 4740131) so as to fabricate a spread yarn sheet having a width of 320 mm in which the reinforced fibers were dispersed entirely with a substantially uniform thickness. The fiber weight of the spread yarn sheet was 51.5 g/m².

(4) The spread yarn sheet was continuously introduced into a prepreg sheet manufacturing device (made by Kasamatsu Kako Kenkyujo Co., Ltd.) and overlapped with the epoxy resin sheet fabricated in the process (2) so as to fabricate a prepreg sheet with a width of approximately 320 mm and a resin weight rate (Wm) of approximately 20% in which the epoxy resin was impregnated into the spread yarn sheet. The fabricated prepreg sheet had a thickness of approximately 40 μm and a fiber volume content (Vf) of approximately 72.5% when being calculated on the basis of the used spread yarn sheet and epoxy resin sheet.

(5) To the epoxy resin fabricated in the process (1), resin powder SP-500 was kneaded in a weight ratio of 7:3 so as to fabricate an epoxy resin with the resin powder.

(6) In the resin coating device similar to that in the process (2), the epoxy resin with resin powder fabricated in the process (5) was continuously applied with the width of 340 mm and the application amount of 45 g/m² onto the mold releasing paper so as to fabricate the epoxy resin sheet with resin powder.

(7) On one surface of the prepreg sheet fabricated in the process (4), the epoxy resin sheet with resin powder fabricated in the process (6) was overlapped so as to form a resin layer in which powder made of the thermoplastic resin material is dispersed on the one surface of the prepreg sheet and to form a composite sheet having the resin layer and the prepreg sheet. The composite sheet had the resin layer with the thickness of approximately 40 μm formed on the one surface of the prepreg sheet with the thickness of approximately 40 μm in calculation.

(8) The prepreg sheet obtained by the process (4) and the composite sheet obtained by the process (7) were cut as appropriate and laminated so as to fabricate a laminated molded body. In lamination, the prepreg sheet to be the fiber reinforced layer were overlapped by setting four directions so that the axial directions of the reinforced fibers to a reference direction form angles of 45°, 0°, −45° and 90°. Then, the composite sheet was inserted as appropriate between the overlapped prepreg sheets so that the resin layer was laminated by every two or three fiber reinforced layers.

The obtained laminated object has the lamination constitution of $[45/0/-45/90]_{6S}$ and disposition of the resin layer is as follows. The lamination constitution was 45/0/resin layer/−45/90/45/resin layer/0/−45/90/resin layer/45/0/−45/resin layer/90/45/0/resin layer/−45/90/45/resin layer/0/−45/90/resin layer/45/0/−45/resin layer/90/90/resin layer/−45/0/45/resin layer/90/−45/0/resin layer/45/90/−45/resin layer/0/45/90/resin layer/−45/0/45/resin layer/90/−45/0/resin layer/45/90/−45/resin layer/0/45. In the laminated object, the fiber reinforced layers were constituted by 48 layers, and the resin layers by 16 layers, and the resin layer was disposed at four spots each between fiber reinforced layers of 45° and 0°, 0° and −45°, −45° and 90°, and 90° and 45°, respectively.

Therefore, the constitution in which the resin layer is disposed adjacent to all the fiber reinforced layers set to different directions was obtained.

When the obtained laminated object is molded/solidified, the fiber volume content (Vf) is approximately 54% in calculation.

<Molding/Solidification of Laminated Molded Body>

(1) The obtained laminated object was subjected to heating processing at 130° C. for 2 hours by an autoclave device (made by ASHIDA MFG CO., Ltd.) so as to harden the epoxy resin contained therein and to fabricate a plate-shaped molded product with the width of 320 mm×length of 320 mm.

Figure 2:
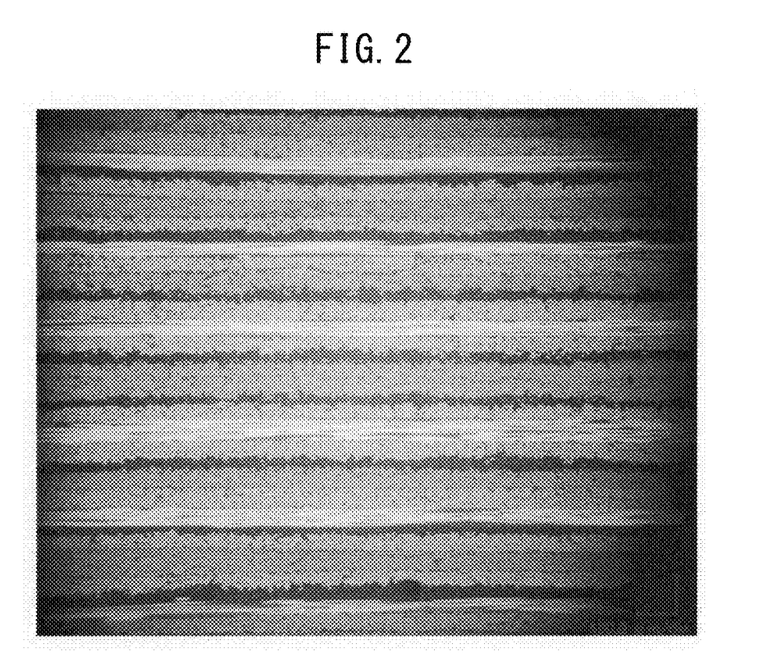
FIG. 2 is a photo obtained by photographing a section of a plate-shaped molded product of Example 1.

(2) The obtained plate-shaped molded product had a thickness of 2.54 mm. FIG. 2 is a photo taken by a microscope device (made by SONIC) of a section cut along a lamination direction of the plate-shaped molded product. In the photo, a portion of the resin layer appears as a black layer, and the fiber reinforced layers appearing in white between the resin layers are laminated in two to three layers. It is known that each layer is formed with a substantially uniform thickness, respectively, and laminated.

<Measurement of Thickness of Fiber Reinforced Layer>

The thickness of the fiber reinforced layer was measured by using the photo obtained by photographing the section of the plate-shaped molded product in the lamination direction. Specifically, ten measurement lines were set in the lamination direction (thickness direction), and the measurement lines were disposed at a predetermined interval (10 mm interval in the photo in FIG. 2). Then, a length between points where a boundary surface on both sides of each fiber reinforced layer crosses the measurement line was measured, and an average value of the measurement values of the ten measurement lines was made a thickness of each fiber reinforced layer. If a reinforced fiber is separated from the fiber reinforced layer and contained in the resin layer, the boundary surface of the fiber reinforced layer was set by excluding those separated from the fiber reinforced layer by a diameter or more of the reinforced fiber. In the case of FIG. 2, the average thickness of each fiber reinforced layer was approximately 40 μm.

<Tension Test and its Test Result>

(1) The obtained plate-shaped molded product was cut into a strip shape having a width of 20 mm×a length of 250 mm, and a fabricated specimen was used to conduct the tension test. For the tension test, a universal material testing machine AUTOGRAPH (load cell 10 tons; made by SHIMAZU CORPORATION) was used, and strain was measured by using an axial elongation meter made by MTS Systems Corporation with a gauge length of 100 mm. In the tension test, AE (Acoustic Emission) sensors were mounted at upper and lower two spots on the specimen, and initial stress at failure and delamination were measured by measuring an AE signal output from a piezo-electric element with the breakage. As the AE sensor, a sensor having a resonant frequency of 150 kHz (made by Nippon Physical Acoustics, Ltd.) was used. An AE signal detected from the AE sensor was processed by a pre-amp (set to 20 dB) and a band-pass filter (100 kHz to 300 kHz). Then, time when an AE signal with large amplitude was measured and large energy release was detected was assumed to be the time of occurrence of delamination.

(2) As the result of the tension test, the stress at failure was approximately 1058 MPa, failure strain was approximately 2.02%, and an initial modulus of elasticity was approximately 50 GPa. The delamination occurs at the time when strain was approximately 1.8%.

<Fatigue Test and its Test Result>

(1) A plate material of a glass fiber reinforced composite material was bonded to the obtained plate-shaped molded product as a tab material for a fatigue test, and the fatigue test was conducted by using the specimen cut into a predetermined size (width of 20 mm×length of 200 mm).

In the fatigue test, a servo pulsar EHF-100 kN (made by Shimadzu Corp.) was used. Test conditions were set to be tension by stress control–tension fatigue, a gauge length of 100 mm, an input waveform being a stress ratio R: 1/10 sinusoidal wave, and a frequency f: 5 Hz. Regarding an applied maximum load (strain), an experiment was conducted for two types, that is, 400 MPa (approximately 0.8%) and 500 MPa (approximately 1%). Then, when the number of cycles reached $10^6$ times (1 million times), the fatigue test was finished, and a section cut along the lamination direction of the specimen after the test was finished was observed by using an optical microscope.

Figure 3:
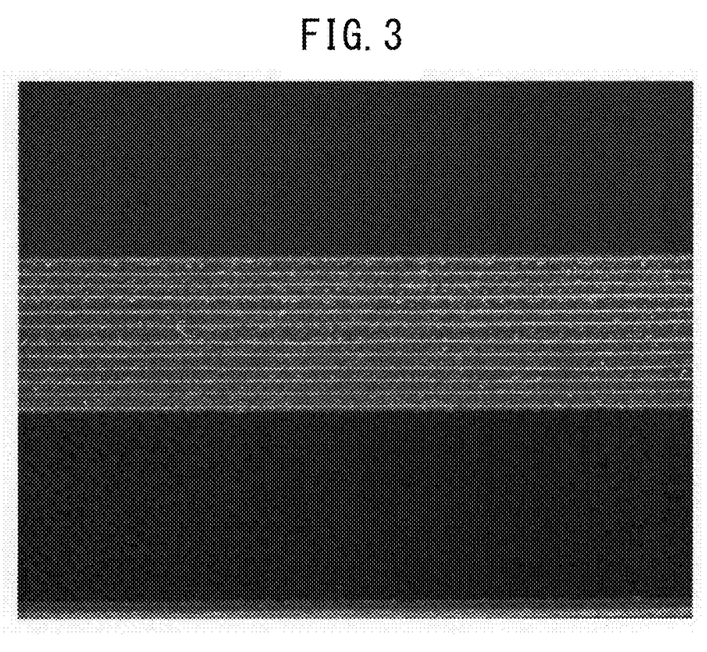
FIG. 3 is a photo obtained by photographing a section of a specimen after a fatigue test (maximum load of 400 MPa) of Example 1 is conducted.
Figure 4:
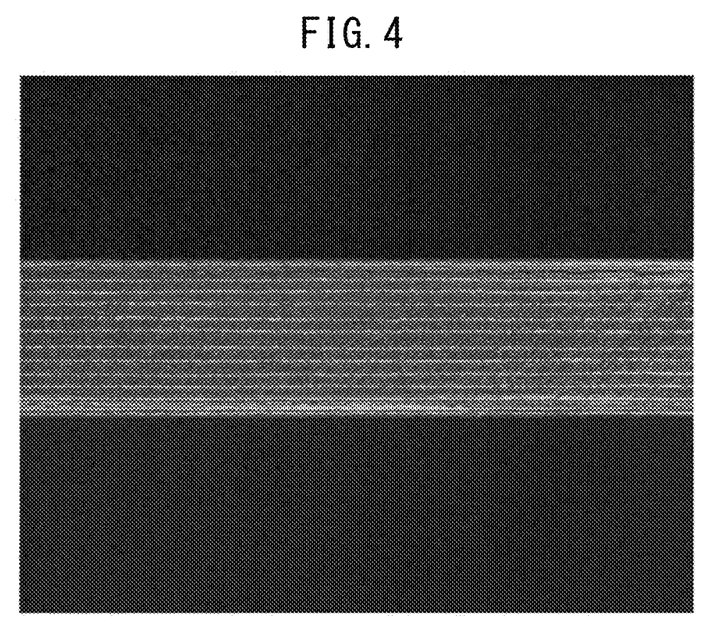
FIG. 4 is a photo obtained by photographing a section of a specimen after the fatigue test (maximum load of 500 MPa) of Example 1 is conducted.

(2) FIGS. 3 and 4 are photos taken by photographing a section when the maximum load was 400 MPa and 500 MPa. As illustrated in FIG. 3, when the maximum load was 400 MPa, there was no internal damage by the fatigue test, and a sound state was observed. Moreover, as illustrated in FIG. 4, if the maximum load was 500 MPa, as the result of the fatigue test, occurrence of delamination in an outer layer of the specimen was observed. An opening amount of the observed delamination was slight.

Example 2

The material similar to that of Example 1 was used so as to fabricate a thin laminated molded body, and a CAI test (Compression after Impact test) was conducted.

<Lamination of Laminated Molded Body>

(1) Similarly to the processes (1) to (7) of Example 1, a prepreg sheet having a width of approximately 320 mm and a resin weight rate (Wm) of approximately 20% was fabricated, and a composite sheet in which the resin layer with the resin powder made of the thermoplastic resin material dispersed on one surface of the prepreg sheet was formed was fabricated. The thickness of the fabricated prepreg sheet was approximately 40 μm, and the thickness of the composite sheet was approximately 80 μm. The thickness of the resin layer in the composite sheet was approximately 40 μm.

(2) By using the obtained prepreg sheet and composite sheet, similarly to the process (8) of Example 1, the both sheets were overlapped so that the resin layer is formed by every two or three laminated fiber reinforced layers, and the laminated molded body with the lamination constitution of $[45/0/-45/90]_{12S}$ was fabricated. The fabricated laminated object is constituted by 96 thin fiber reinforced layers, and the resin layer by 32 layers, and the resin layer is disposed at eight spots each between fiber reinforced layers of 45° and 0°, 0° and −45°, −45° and 90°, and 90° and 45°, respectively. The laminated product obtained by molding/solidifying the laminated object has the fiber volume content (Vf) of approximately 54% in calculation.

<Molding/Solidification of Laminated Molded Body>

Similarly to the process (9) of Example 1, the epoxy resin contained in the laminated object was hardened so as to fabricate the plate-shaped molded product with the width of 320 mm×length of 320 mm. The obtained plate-shaped molded product had the thickness of 4.98 mm.

<Measurement of Thickness of Fiber Reinforced Layer>

Similarly to Example 1, as the result of measurement using the photo taken by photographing the section of the plate-shaped molded product in the lamination direction, the average thickness of the fiber reinforced layer was approximately 39 μm.

<CAI Test and its Test Result>

By using a specimen with a vertical length of 100 mm×lateral length of 150 mm fabricated by cutting the obtained plate-shaped molded product, the CAI test was conducted. In the CAI test, first, a falling-weight impact testing machine (falling-weight graphic impact tester B-type; made by Toyoseiki Co., Ltd.) was used, a falling-weight of 5.4 kg was made to free-fall from a height of approximately 63 cm so as to apply an impact of an energy value at approximately 6.7 J/mm to the specimen in the lamination direction. As the result of internal observation of the specimen after the impact test by an ultrasonic flaw detector (AT-3000; made by Hitachi Construction Machinery Co., Ltd.), no large delamination was observed. That is, it was found that not only in a portion of the resin layer but also in a portion in which the fiber reinforced layers are laminated, large delamination did not occur to the impact load. With respect to the specimen subjected to the impact test, a compression test was conducted by using a universal material testing machine UH-F1000kNI (load cell 100 tons; made by Shimadzu Corp.). As the result of the compression test, stress at failure was approximately 327 MPa.

Example 3

A thin laminated molded body was fabricated by using the material similar to that of Example 1, and the laminated molded body CAI test (Compression after Impact test) was conducted.

<Lamination of Laminated Molded Body>

(1) Similarly to the processes (1) to (4) of Example 1, a prepreg sheet having a width of approximately 320 mm and a resin weight rate (Wm) of approximately 20% was fabricated.

(2) The epoxy resin with resin powder fabricated in the process (5) of Example 1 was continuously applied with the width of 340 mm and the application amount of 33 g/m² by the resin coating device similar to that in the process (2) of Example 1 onto the mold release paper so as to fabricate the epoxy resin sheet with resin powder.

(3) The epoxy resin sheet with resin powder fabricated in the process (2) was overlapped with one surface of the prepreg sheet fabricated in the process (1) so as to form a resin layer in which the powder made of the thermoplastic resin material is dispersed on the one surface of the prepreg sheet so as to fabricate a composite sheet having the resin layer and the prepreg sheet. The composite sheet had the resin layer with the thickness of approximately 29 μm formed on the one surface of the prepreg sheet with the thickness of approximately 40 μm in calculation.

(4) By using the prepreg sheet obtained in the process (1) and the composite sheet obtained in the process (3), the both sheets were overlapped similarly to the process (8) of Example 1 so that the resin layer is formed by every two, five or six laminated fiber reinforced layers so as to fabricate a laminated object with the lamination constitution of [45/0/−45/90]$_{15S}$. The disposition of the resin layer is as follows. The lamination constitution was 45/0/resin layer/−45/90/45/0/−45/resin layer/90/45/0/−45/90/resin layer/45/0/−45/90/45/resin layer/0/−45/90/ . . . /45/resin layer/0/−45/90/90/−45/0/resin layer/45/ . . . /90/−45/0/resin layer/45/90/−45/0/45/resin layer/90/−45/0/45/90/resin layer/−45/0/45/90/−45/resin layer/0/45. In the fabricated laminated molded body, the thin fiber reinforced layers were constituted by 120 layers, and the resin layers by 24 layers, and the resin layer was disposed at six spots each between fiber reinforced layers of 45° and 0°, 0° and −45°, −45° and 90°, and 90° and 45°, respectively. Therefore, the constitution in which the resin layer is disposed adjacent to all the fiber reinforced layers set to different directions was obtained.

When the obtained laminated object is molded/solidified, the fiber volume content (Vf) is approximately 63% in calculation.

<Molding/Solidification of Laminated Molded Body>

Similarly to the process (9) of Example 1, the epoxy resin contained in the laminated object was hardened so as to fabricate the plate-shaped molded product with the width of 320 mm×length of 320 mm. The obtained plate-shaped molded product had the thickness of approximately 5.4 mm.

<Measurement of Thickness of Fiber Reinforced Layer>

Similarly to Example 1, as the result of measurement using the photo taken by photographing the section of the plate-shaped molded product in the lamination direction, the thickness of the fiber reinforced layer was approximately 39 μm.

<CAI Test and its Test Result>

By using a specimen with a vertical length of 100 mm×lateral length of 150 mm fabricated by cutting the obtained plate-shaped molded product, the CAI test was conducted. In the CAI test, first, the impact testing machine similar to that of Example 2 was used, and a falling-weight of 5.4 kg was made to free-fall from a height of approximately 68 cm so as to apply an impact of an energy value at approximately 6.7 J/mm to the specimen in the lamination direction. To the specimen subjected to the impact test, the compression test similar to that of Example 2 was conducted. As the result of the compression test, the stress at failure was approximately 367 MPa.

Example 4

A thin laminated molded body was fabricated by using the material similar to that of Example 1, and the laminated molded body CAI test (Compression after Impact test) was conducted.

<Lamination of Laminated Molded Body>

(1) Similarly to the processes (1) to (7) of Example 1, a prepreg sheet having a width of approximately 320 mm and a resin weight rate (Wm) of approximately 20% was fabricated, and a composite sheet in which the resin layer with the resin powder made of the thermoplastic resin material dispersed on one surface of the prepreg sheet was formed was fabricated. The thickness of the fabricated prepreg sheet was approximately 40 μm, and the thickness of the composite sheet was approximately 80 μm. The thickness of the resin layer in the composite sheet was approximately 40 μm.

(2) By using the obtained prepreg sheet and composite sheet, similarly to the process (8) of Example 1, the both sheets were overlapped so that the resin layer is formed by every four laminated fiber reinforced layers, and the laminated object with the lamination constitution of [45/0/−45/90]$_{12S}$ was fabricated. In the fiber reinforced layer at a center part, the resin layer was not disposed between layers where two layers were overlapped in a 90° direction. The disposition of the resin layer is as follows. The lamination constitution was 45/0/−45/90/resin layer/45/0/−45/90/resin layer/ . . . /45/0/−45/90/resin layer/45/0/−45/90/−45/0/45/resin layer/90/−45/0/45/ . . . /resin layer/90/−45/0/45/ resin layer/90/−45/0/45. The fabricated laminated molded body is constituted by 96 thin fiber reinforced layers, and the resin layer is disposed only between layers of 90° and 45° and by 22 layers in total. The molded product obtained by molding/solidifying the laminated object has the fiber volume content (Vf) of approximately 59% in calculation.

<Molding/Solidification of Laminated Molded Body>

Similarly to the process (9) of Example 1, the epoxy resin contained in the laminated object was hardened so as to fabricate the plate-shaped molded product with the width of 320 mm×length of 320 mm. The obtained plate-shaped molded product had the thickness of 4.62 mm.

<Measurement of Thickness of Fiber Reinforced Layer>

Similarly to Example 1, as the result of measurement using the photo taken by photographing the section of the plate-shaped molded product in the lamination direction, the average thickness of the fiber reinforced layer was approximately 39 μm.

<CAI Test and its Test Result>

By using a specimen with a vertical length of 100 mm×lateral length of 150 mm fabricated by cutting the obtained plate-shaped molded product, the CAI test was conducted. In the CAI test, first, the impact testing machine similar to that of Example 2 was used, and a falling-weight of 5.4 kg was made to free-fall from a height of approximately 58 cm so as to apply an impact of an energy value at approximately 6.7 J/mm to the specimen in the lamination direction. To the specimen subjected to the impact test, the compression test similar to that of Example 2 was conducted. As the result of the compression test, the stress at failure was approximately 239 MPa.

Comparative Example 1

A laminated molded body was fabricated by using the materials similar to those of Examples and the tension test and the fatigue test were conducted.

<Lamination of Laminated Molded Body>

(1) Similarly to the processes (1) and (2) of Example 1, the epoxy resin was continuously applied with the width of 340 mm and the application amount of 20 g/m² onto the mold release paper so as to fabricate the epoxy resin sheet.

(2) The reinforced fiber bundles are continuously introduced into the prepreg sheet manufacturing device in a sheet state in which 48 bundles are juxtaposed at substantially equal intervals in a width of 320 mm (sheet fiber weight of approximately 155 g/m²), the epoxy resin sheet fabricated in the process (1) was overlapped from above and below so as to fabricate a thick prepreg sheet having a width of approximately 320 mm and a resin weight rate (Wm) of approximately 20% in which the epoxy resin was impregnated into the epoxy resin. The fabricated prepreg sheet has the thickness of approximately 120 μm and the fiber volume content (Vf) of approximately 72% in calculation.

(3) Similarly to the processes (5) and (6) of Example 1, the epoxy resin with resin powder was continuously applied with the width of 340 mm and the application amount of 45 g/m² onto the mold release paper so as to fabricate the epoxy resin sheet with resin powder.

(4) On one surface of the prepreg sheet fabricated in the process (2), the epoxy resin sheet with resin powder fabricated in the process (3) was overlapped so as to form the resin layer in which the powder made of the thermoplastic resin material is dispersed on the one surface of the prepreg sheet and to form the composite sheet having the resin layer and the prepreg sheet. The composite sheet has the resin layer with the thickness of approximately 40 μm formed on the one surface of the prepreg sheet with the thickness of approximately 120 μm in calculation.

(5) The prepreg sheet fabricated in the process (2) and the composite sheet fabricated in the process (4) were used and overlapped so that the resin layer is formed between the fiber reinforced layers so as to fabricate the laminated object with the lamination constitution of $[45/0/-45/90]_{2S}$. The resin layer was not disposed between the layers where the two fiber reinforced layers at the center part overlap in the 90° direction. The molded product obtained by molding/solidifying the obtained laminated object had the fiber volume content (Vf) of approximately 54% in calculation.

<Molding/Solidification of Laminated Molded Body>

Similarly to the process (9) of Example 1, the epoxy resin contained in the laminated object was hardened so as to fabricate the plate-shaped molded product with the width of 320 mm×length of 320 mm. The obtained plate-shaped molded product had the thickness of 2.47 mm.

<Measurement of Thickness of Fiber Reinforced Layer>

Similarly to Example 1, as the result of measurement using the photo taken by photographing the section of the plate-shaped molded product in the lamination direction, the average thickness of the fiber reinforced layer was approximately 119 μm.

<Tension Test and its Test Result>

The obtained plate-shaped molded product was cut into a strip shape having a width of 20 mm×length of 250 mm, and a fabricated specimen was used to conduct the tension test similarly to Example 1. As the result of the tension test, the stress at failure was approximately 950 MPa, failure strain was approximately 1.87%, and an initial modulus of elasticity was approximately 49 GPa. The delamination occurred at the time when strain was approximately 0.9%.

<Fatigue Test and its Test Result>

(1) Similarly to Example 1, a specimen for fatigue test was fabricated from the obtained plate-shaped molded product, and the fatigue test was conducted under the similar test conditions by using the testing machine similar to that of Example 1. Then, when the number of cycles reached $10^6$ times (1 million times), the fatigue test was finished, and a section cut along the lamination direction of the specimen after the test was finished was observed by using an optical microscope.

Figure 5:
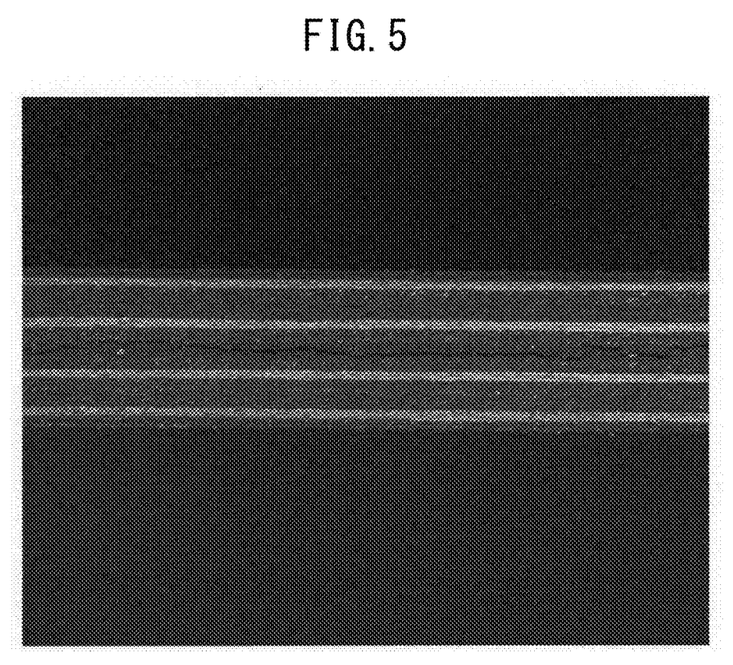
FIG. 5 is a photo obtained by photographing a section of a specimen after the fatigue test (maximum load of 400 MPa) of Comparative Example 1 is conducted.
Figure 6:
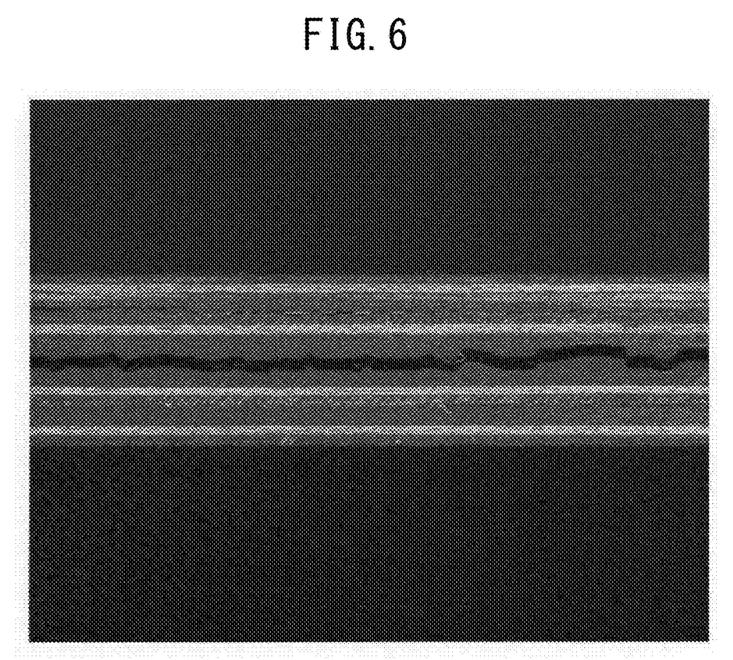
FIG. 6 is a photo obtained by photographing a section of a specimen after the fatigue test (maximum load of 500 MPa) of Comparative Example 1 is conducted.

(2) FIGS. 5 and 6 are photos taken by photographing a section when the maximum load was 400 MPa and 500 MPa, respectively. As illustrated in FIG. 5, when the maximum load was 400 MPa, it was observed that delamination occurred at the center part as the result of the fatigue test. Moreover, as illustrated in FIG. 6, if the maximum load was 500 MPa, as the result of the fatigue test, it was observed that large delamination occurred at the center part, and separation was observed in the periphery of surface layers on the both sides.

Comparative Example 2

A laminated molded body was fabricated by using the material similar to that of Example 1, and the CAI test was conducted.

<Manufacture of Laminated Molded Body>

(1) Similarly to the processes (1) to (4) of Comparative Example 1, a thick prepreg sheet and a thick composite sheet were fabricated.

(2) By using the fabricated prepreg sheet and composite sheet, similarly to the process (5) of Comparative Example 1, the laminated object with the lamination constitution of $[45/0/-45/90]_{4S}$ was fabricated. The molded product obtained by molding/solidifying the obtained laminated object has the fiber volume content (Vf) at approximately 54% in calculation.

(3) Similarly to the process (9) of Example 1, the epoxy resin contained in the laminated object was hardened so as to fabricate a plate-shaped molded product having a width of 320 mm×length of 320 mm. The obtained plate-shaped molded product had the thickness of 5.22 mm.

<Measurement of Thickness of Fiber Reinforced Layer>

Similarly to Example 1, as the result of measurement using the photo taken by photographing the section of the plate-shaped molded product in the lamination direction, the average thickness of the fiber reinforced layer was approximately 119 µm.

<CAI Test and its Test Result>

By using a specimen with a vertical length of 100 mm×lateral length of 150 mm fabricated by cutting the obtained plate-shaped molded product, the impact test was conducted similarly to Example 2. In the impact test, a falling-weight of 5.4 kg was made to fall from a height of approximately 65 cm so as to apply an impact of an energy value at approximately 6.7 J/mm to the specimen from the lamination direction. After that, the compression test similar to that of Example 2 was conducted. As the result of the compression test, the stress at failure was approximately 320 MPa.

Comparative Example 3

A laminated molded body was fabricated by using the material similar to that of Example 1, and the CAI test was conducted.

<Manufacture of Laminated Molded Body>

(1) Similarly to the process (1) of Comparative Example 1, an epoxy resin was continuously applied with a width of 340 mm and an application amount of 30 g/m² onto mold release paper so as to fabricate an epoxy resin sheet.

(2) Similarly to the process (2) of Comparative Example 1, the reinforced fiber bundles are continuously introduced into the prepreg sheet manufacturing device in a sheet state in which 40 bundles are juxtaposed at substantially equal intervals in a width of 320 mm (sheet fiber weight at approximately 129 g/m²), the epoxy resin sheet fabricated in the process (1) was overlapped from above and below so as to fabricate a thick prepreg sheet having a width of approximately 320 mm and a resin weight rate (Wm) of approximately 32% in which the epoxy resin was impregnated into the reinforced fiber bundles. The fabricated prepreg sheet has the thickness of approximately 120 µm and the fiber volume content (Vf) of approximately 59% in calculation.

(3) By using the fabricated prepreg sheet, the laminated object with the lamination constitution of $[45/0/-45/90]_{4S}$ was fabricated. The molded product obtained by molding/solidifying the obtained laminated object has the fiber volume content (Vf) at approximately 59% in calculation.

(4) Similarly to the process (9) of Example 1, the epoxy resin contained in the laminated object was hardened so as to fabricate a plate-shaped molded product having a width of 320 mm×length of 320 mm. The obtained plate-shaped molded product had the thickness of 3.92 mm.

<Measurement of Thickness of Fiber Reinforced Layer>

Similarly to Example 1, as the result of measurement using the photo taken by photographing the section of the plate-shaped molded product in the lamination direction, the average thickness of the fiber reinforced layer was approximately 122 µm.

<CAI Test and its Test Result>

By using a specimen with a vertical length of 100 mm×lateral length of 150 mm fabricated by cutting the obtained plate-shaped molded product, the impact test was conducted similarly to Example 2. In the impact test, a falling-weight of 5.4 kg was made to fall from a height of approximately 50 cm so as to apply an impact of an energy value at approximately 6.7 J/mm to the specimen in the lamination direction. After that, the compression test similar to that of Example 2 was conducted. As the result of the compression test, the stress at failure was approximately 171 MPa.

Comparative Example 4

A laminated molded body was fabricated by using the material similar to that of Example 1, and the CAI test was conducted.

<Manufacture of Laminated Molded Body>

(1) Similarly to the process (1) of Comparative Example 1, an epoxy resin was continuously applied with a width of 340 mm and an application amount of 20 g/m² onto mold release paper so as to fabricate an epoxy resin sheet.

(2) Similarly to the process (3) of Example 1, the 13 reinforced fiber bundles were juxtaposed at an interval of 24 mm in a width direction, and a spread yarn sheet having a width of approximately 320 mm in which each reinforced fiber bundle was spread was fabricated. The fiber weight of the spread yarn sheet was approximately 43 g/m².

(3) Similarly to the process (4) of Example 1, the spread yarn sheet was continuously introduced into the prepreg sheet manufacturing device and overlapped with the epoxy resin sheet fabricated in the process (1) so as to fabricate a prepreg sheet with a width of approximately 320 mm and a resin weight rate (Wm) of approximately 32% in which the epoxy resin was impregnated into the spread yarn sheet. The fabricated prepreg sheet had a thickness of approximately 40 µm and a fiber volume content (Vf) of approximately 59% in calculation.

(4) By using the fabricated prepreg sheet, the laminated object with the lamination constitution of $[45/0/-45/90]_{12S}$ was fabricated. The molded product obtained by molding/solidifying the obtained laminated object has the fiber volume content (Vf) at approximately 59% in calculation.

(5) Similarly to the process (9) of Example 1, the epoxy resin contained in the laminated object was hardened so as to fabricate a plate-shaped molded product having a width of 320 mm×length of 320 mm. The obtained plate-shaped molded product had the thickness of 3.94 mm.

<Measurement of Thickness of Fiber Reinforced Layer>

Similarly to Example 1, as the result of measurement using the photo taken by photographing the section of the plate-shaped laminated product in the lamination direction, the average thickness of the fiber reinforced layer was approximately 41 µm.

<CAI Test and its Test Result>

By using a specimen with a vertical length of 100 mm×lateral length of 150 mm fabricated by cutting the obtained plate-shaped molded product, the impact test was conducted similarly to Example 2. In the impact test, a falling-weight of 5.4 kg was made to fall from a height of approximately 50 cm so as to apply an impact of an energy value at approximately 6.7 J/mm to the specimen from the lamination direction. After that, the compression test similar to that of Example 2 was conducted. As the result of the compression test, the stress at failure was approximately 182 MPa.

Comparison Between Example and Comparative Example

When Example 1 and Comparative Example 1 are compared, in Comparative Example 1, since the thickness of the fiber reinforced layer is as large as 120 μm, delamination occurred in an early stage of the tension test in which strain was approximately 0.9%, while in Example 1, delamination occurred at strain of approximately 1.8% in the tension test, whereby it is known that delamination is suppressed in the thin fiber reinforced layer. In the fatigue test, too, a fatigue life is longer in Example 1 than in Comparative Example 1, and a favorable result was obtained.

When Examples 2 and 3 are compared with Comparative Examples 2, 3, and 4, by disposing the resin layer between the fiber reinforced layers, the CAI test value exceeded 300 MPa. As is known from Examples 2 and 3, by combining the portion in which the thin fiber reinforced layer is laminated and the portion including the resin layer between the thin fiber reinforced layers, large delamination did not occur not only in the resin layer but also between the laminated thin fiber reinforced layers and thus, it can be considered that impact resistance was improved.

When Example 4 is compared with Comparative Examples 3 and 4, it is known that the CAI test value was improved by disposing the resin layer between the fiber reinforced layers by every four layers. If the resin layer is not disposed, the CAI test value becomes 200 MPa or less, and impact resistance can be improved even if the resin layer is disposed adjacent to the fiber reinforced layer with the axial direction set in a specific direction. However, looking at the test results of Examples 2 and 3 and Example 4, if the resin layer is disposed by every plural fiber reinforced layers, improvement of impact resistance and suppression of delamination can be realized, but a more favorable result can be obtained by disposing the resin layer between the fiber reinforced layers so as to be adjacent to the fiber reinforced layers set in all the directions as in Examples 2 and 3.

From the results of Examples 2 and 3, it is known that the CAI value is improved by improvement of the fiber volume content of the laminated molded body.

REFERENCE SIGNS LIST

F laminated molded body
SR Fiber reinforced layer
TP resin layer

The invention claimed is:

1. A laminated molded body, comprising:
at least one first laminated portion comprising a plurality of overlapping fiber reinforced layers including:
a first fiber reinforced layer in which a reinforcing fiber material is dispersed in a resin material which serves as a matrix being laminated, wherein a thickness of the first fiber reinforced layer is set to 20 to 80 μm, and
a second fiber reinforced layer in which a reinforcing fiber material is dispersed in a resin material which serves as a matrix being laminated, wherein a thickness of the second fiber reinforced layer is set to 20 to 80 μm, said first fiber reinforced layer and said second fiber reinforced layer being directly laminated to form the first laminated portion; and
at least one second laminated portion including:
a third fiber reinforced layer in which a reinforcing fiber material is dispersed in a resin material which serves as a matrix being laminated, wherein a thickness of the third fiber reinforced layer is set to 20 to 80 μm, and
a resin layer disposed on a surface of the third fiber reinforced layer, said third fiber reinforced layer and said resin layer being laminated to form the second laminated portion,
wherein the at least one first laminated portion and the at least one second laminated portion are laminated to each other.

2. The laminated molded body according to claim 1, wherein
the fiber reinforced layers in said at least one first laminated portion are laminated with axial directions set to different directions, and the resin layer of said second laminated portion is disposed adjacent to the fiber reinforced layers in said at least one d first laminated portion in all the set directions.

3. The laminated molded body according to claim 1, wherein
in the fiber reinforced layer in said at least one first laminated portion, the axial direction of the reinforcing fiber material is one direction.

4. The laminated molded body according to claim 1, wherein
a plurality of the laminated fiber reinforced layers in said at least one first laminated portion is constituted by using a multi-axis reinforced sheet material.

5. The laminated molded body according to claim 1, wherein
at least one of powder, a fiber, and a film is dispersed in the resin constituting the resin layer.

6. The laminated molded body according to claim 1, wherein the resin material and the resin layer are thermosetting resin materials and a thermoplastic resin material is dispersed in the resin layer.

7. A composite molded body, comprising:
the laminated molded body according to claim 1 combined with another molded body.

* * * * *